(12) United States Patent
Wang et al.

(10) Patent No.: US 11,741,005 B2
(45) Date of Patent: *Aug. 29, 2023

(54) USING DATA MIRRORING ACROSS MULTIPLE REGIONS TO REDUCE THE LIKELIHOOD OF LOSING OBJECTS MAINTAINED IN CLOUD OBJECT STORAGE

(71) Applicant: VMware, Inc., Palo Alto, CA (US)

(72) Inventors: Wenguang Wang, Santa Clara, CA (US); Vamsi Gunturu, Cupertino, CA (US); Junlong Gao, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,018

(22) Filed: Sep. 22, 2022

(65) Prior Publication Data
US 2023/0020366 A1    Jan. 19, 2023

Related U.S. Application Data

(63) Continuation of application No. 16/882,327, filed on May 22, 2020, now Pat. No. 11,481,319.

(51) Int. Cl.
| | | |
|---|---|---|
| *G06F 12/00* | (2006.01) | |
| *G06F 11/10* | (2006.01) | |
| *G06F 11/00* | (2006.01) | |
| *G06F 12/02* | (2006.01) | |
| *G06F 11/20* | (2006.01) | |
| *G06F 16/27* | (2019.01) | |

(52) U.S. Cl.
CPC ...... *G06F 12/0253* (2013.01); *G06F 11/1048* (2013.01); *G06F 11/2056* (2013.01); *G06F 16/27* (2019.01)

(58) Field of Classification Search
CPC .. G06F 12/0253; G06F 16/27; G06F 11/1048; G06F 11/2056
See application file for complete search history.

(56) References Cited

U.S. PATENT DOCUMENTS

| | | | |
|---|---|---|---|
| 7,386,758 B2 | 6/2008 | Kitamura | |
| 7,734,643 B1 | 6/2010 | Waterhouse et al. | |
| 9,152,556 B2* | 10/2015 | Olbrich | G06F 12/0246 |
| 10,310,943 B2 | 6/2019 | Huang et al. | |
| 10,809,923 B2 | 10/2020 | Frank et al. | |

(Continued)

OTHER PUBLICATIONS

Non-Final Office Action issued in Related U.S. Appl. No. 16/882,246, dated Dec. 22, 2022, 10 pages.

(Continued)

*Primary Examiner* — Justin R Knapp (57) ABSTRACT

Techniques for using data mirroring across regions to reduce the likelihood of losing objects in a cloud object storage platform are provided. In one set of embodiments, a computer system can upload first and second copies of a data object to first and second regions of the cloud object storage platform respectively, where the first and second copies are identical. The computer system can then attempt to read the first copy of the data object from the first region. If the read attempt fails, the computer system can retrieve the second copy of the data object from the second region.

21 Claims, 5 Drawing Sheets

(56) References Cited

U.S. PATENT DOCUMENTS

| | | | |
|---|---|---|---|
| 11,003,532 B2 | 5/2021 | Huang et al. | |
| 11,074,129 B2 | 7/2021 | Horn | |
| 11,093,139 B1 | 8/2021 | Karr et al. | |
| 11,150,986 B2 | 10/2021 | Li | |
| 2010/0161688 A1* | 6/2010 | Kesselman | G06F 16/1844 |
| | | | 707/813 |
| 2012/0233463 A1 | 9/2012 | Holt et al. | |
| 2012/0233668 A1 | 9/2012 | Leafe et al. | |
| 2013/0346444 A1* | 12/2013 | Makkar | G06F 16/907 |
| | | | 707/770 |
| 2014/0229654 A1* | 8/2014 | Goss | G06F 12/0238 |
| | | | 711/103 |
| 2018/0341551 A1 | 11/2018 | Regni et al. | |
| 2019/0370170 A1 | 12/2019 | Oltean et al. | |
| 2021/0263795 A1 | 8/2021 | Li | |
| 2021/0349793 A1 | 11/2021 | Wang et al. | |
| 2021/0357385 A1 | 11/2021 | Wang et al. | |
| 2021/0365318 A1 | 11/2021 | Wang et al. | |
| 2021/0365365 A1 | 11/2021 | Wang et al. | |

OTHER PUBLICATIONS

Non-Final Office Action issued in Related U.S. Appl. No. 16/882,338, dated May 2, 2022, 18 pages.
Final Office Action issued in Related U.S. Appl. No. 16/882,246, dated Jul. 22, 2022, 7 pages.
Notice of Allowance issued in Related U.S. Appl. No. 16/882,338, dated Sep. 22, 2022, 12 pages.
Notice of Allowance issued in Related U.S. Appl. No. 16/882,327, dated Jun. 23, 2022, 8 pages.

* cited by examiner

USING DATA MIRRORING ACROSS MULTIPLE REGIONS TO REDUCE THE LIKELIHOOD OF LOSING OBJECTS MAINTAINED IN CLOUD OBJECT STORAGE

CROSS-REFERENCES TO RELATED APPLICATIONS

This present application is a continuation of U.S. patent application Ser. No. 16/882,327 filed May 22, 2020, now U.S. Pat. No. 11,481,319 issued Oct. 25, 2022, and entitled "Using Data Mirroring Across Multiple Regions to Reduce the Likelihood of Losing Objects Maintained in Cloud Object Storage." In addition, the present application is related to the following commonly-owned U.S. Patent Applications:
1. U.S. patent application Ser. No. 16/882,246, now U.S. Pat. No. 11,556,423, entitled "Using Erasure Coding in a Single Region to Reduce the Likelihood of Losing Objects Maintained in Cloud Object Storage; and
2. U.S. patent application Ser. No. 16/882,338, now U.S. Pat. No. 11,544,147, entitled "Using Erasure Coding Across Multiple Regions to Reduce the Likelihood of Losing Objects Maintained in Cloud Object Storage."

The entire contents of the foregoing applications are incorporated herein by reference for all purposes.

BACKGROUND

Object storage is a data storage model that manages data in the form of logical containers known as objects, rather than in the form of files (as in file storage) or blocks (as in block storage). Cloud object storage is an implementation of object storage that maintains these objects on a cloud infrastructure, which is a server infrastructure that is accessible via the Internet. Examples of existing cloud object storage platforms include Amazon Simple Storage Service (S3), Microsoft Azure Storage, and Google Cloud Storage.

Cloud object storage generally offers higher durability and lower cost than other types of storage solutions, and thus is often used by enterprise customers to backup large volumes of data for disaster recovery and long-term retention/archival. For instance, Amazon guarantees an annual object durability of 99.999999999% for S3, which means there is a 0.000000001% chance that a customer will lose a given object stored in S3 in a given year. However, because this durability guarantee applies to each individual object, as the number of objects maintained in S3 increases, the likelihood that at least one of the objects will be lost also increases. This risk of object loss can grow to a significant level for customers that backup very large numbers of objects.

For example, consider a customer A that has 10 petabytes (PB) of data stored in S3, divided into objects which are each 4 megabytes (MB) in size (resulting in 2,684,354,560 total objects). In this case, the annual durability of customer A's objects will be $0.99999999999^{2684354560} = \sim 0.97$ (or 97%), which means there is a 3% chance that customer A will lose at least one of its objects per year. As a further example, consider a customer B that has 100PB of data stored in S3, divided into the same 4 MB-sized objects (resulting in 26,843,545,600 total objects). In this case, the annual durability of customer B's objects will be $0.99999999999^{26843545600} = \sim 0.76$ (or 76%), which means there is a 24% chance that customer B will lose at least one of its objects per year.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for using data mirroring across multiple regions of a cloud object storage platform to reduce the likelihood of losing objects maintained in that platform. As used herein, a "region" is a set of cloud infrastructure servers located within a defined geographic area (e.g., the Eastern U.S., the Western U.S., etc.) and a "region of a cloud object storage platform" is a region that hosts a portion of such a platform. Data mirroring is a data protection technique that involves storing duplicate copies of data at different locations. A well-known data mirroring implementation in the field of distributed/multi-disk storage is Redundant Array of Independent Disks (RAID) level 1 (RAID-1).

At a high level, the techniques of the present disclosure comprise identifying, at the time of backing up a data set from a source data center to a cloud object storage platform, at least two regions R1 and R2 of the platform for holding data objects representing the data set. The data objects can then be uploaded to both R1 and R2, such that each region maintains a duplicate (i.e., mirror) copy of the data objects. With this approach, if a given data object subsequently becomes lost (i.e., corrupted or otherwise inaccessible) in one region, a mirror copy of the data object can be retrieved from the other region.

In addition, the techniques of the present disclosure include a novel process for garbage collecting data objects that have been mirrored to regions R1 and R2 via a first "master" garbage collector component running in the region where the data objects' metadata resides and a second "slave" garbage collector component running in the other region. With this master/slave configuration, the amount of data that is transferred between regions R1 and R2 in order to carry out the garbage collection process can be kept low, which in turn minimizes the network bandwidth costs incurred for the process.

The foregoing and other aspects of the present disclosure are described in further detail in the sections that follow.

2. Example System Environment and Solution Architecture

Figure 1:
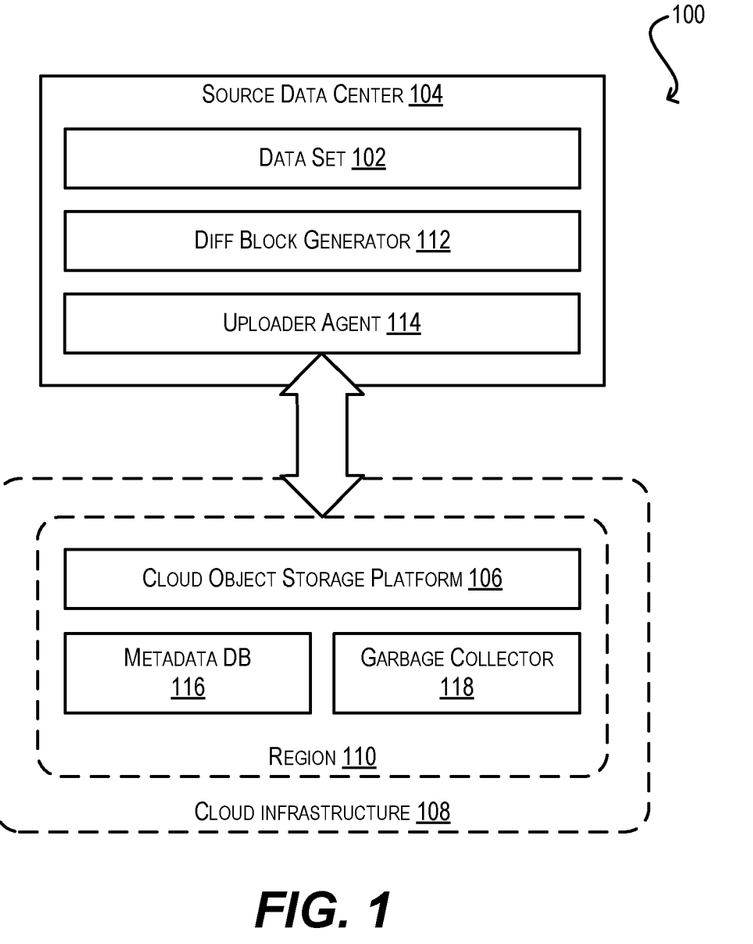
FIG. 1 depicts an example system environment.

To provide context for the embodiments presented herein, FIG. 1 depicts an example system environment 100 in which a data set 102 is periodically backed up from a source data center 104 to a cloud object storage platform 106 that is part of a cloud infrastructure 108. Data set 102 may be, e.g., a virtual disk file (VMDK), a hyper-converged infrastructure (HCl) storage object, or any other collection of data that consists of a base version and multiple delta versions comprising updates/modifications made to data set 102 over time. Source data center 104 may be operated by a customer of cloud object storage platform 106/cloud infrastructure 108, such as an enterprise. Cloud object storage platform 106/cloud infrastructure 108 may be operated by a third-party cloud service provider, such as Amazon, Microsoft, Google, or the like.

As shown, cloud object storage platform 106 is deployed in a region 110, which is a set of servers or data centers of cloud infrastructure 108 that are clustered in a particular geographic area. Examples of such geographic areas include the Eastern U.S., the Western U.S., South America, and so on. Although only a single region is depicted in FIG. 1 for simplicity of illustration, cloud infrastructure 108 will typically include a plurality of geographically dispersed regions (to ensure that global customers of cloud infrastructure 108 are relatively close to at least one region) and cloud object storage platform 106 will typically be deployed across several, if not all, of those regions. In the example of FIG. 1, region 110 is assumed to be the region that is geographically closest to source data center 104, and thus source data center 104 is configured to backup data set 102 to the portion of cloud object storage platform 106 deployed in region 110.

To carry out this backup process, source data center 104 includes a diff block generator 112 and an uploader agent 114. In operation, diff block generator 112 identifies logical data blocks in data set 102 that have been modified and provides those logical data blocks to uploader agent 114. In response, uploader agent 114 packages the logical data blocks into objects (referred to herein as "data objects") which conform to the object format of cloud object storage platform 106 and uploads the data objects to region 110 of platform 106. Uploader agent 114 also determines file system metadata changes arising out of the data block modifications, packages the metadata changes into "metadata objects," and uploads the metadata objects to a separate metadata database 116 deployed in region 110.

For purposes of the present disclosure, it is assumed that each data object uploaded to cloud object storage platform 106 has a moderately large (but not too large) fixed size, such as 4 MB (subject to a certain degree of variation due to compression and other factors). This helps reduce the API (application programming interface) costs of uploading data to platform 106 because (1) many cloud object storage platforms charge a fee for each service API invoked against the platform, and (2) uploading data in the form of larger, rather than smaller, objects decreases the number of upload (i.e., PUT) APIs that need to be invoked, which in turn keeps API costs low. At the same time, avoiding a very large object size reduces the overhead of performing object garbage collection (explained below).

In addition, for various reasons, it is assumed that the uploaded data objects are maintained in cloud object storage platform 106 using a log-structured file system (LFS) disk layout. As known in the art, an LFS is a file system in which data is not overwritten in place on disk; instead, each time an update is made to a piece of data, the latest version of that data is written to a new physical disk location in a sequential log format (and thus any older versions of that data remain, at least temporarily, on disk). In the context of FIG. 1, this means that as modifications are made to the logical data blocks of data set 102, uploader agent 114 packages the modified data blocks into new data objects (having, e.g., monotonically increasing log sequence numbers) and uploads those new data objects to cloud object storage platform 106. without overwriting previously uploaded data objects.

Figure 2:
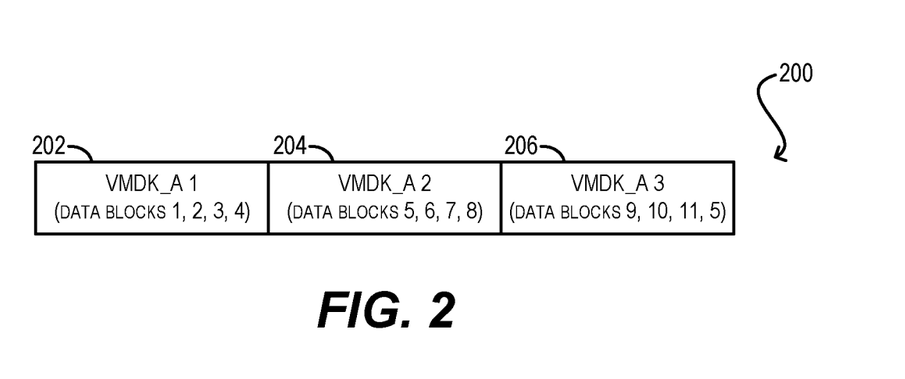
FIG. 2 depicts a log of data objects.

By way of example, FIG. 2 depicts a log of data objects 200 that may be created, via uploader agent 114, in region 110 of cloud object storage platform 106 for a data set named "VMDK_A." As shown in FIG. 2, log 200 includes a first data object "VMDK_A 1" (reference numeral 202) that comprises the data content of logical data blocks 1, 2, 3, and 4 of VMDK_A, a second data object "VMDK_A 2" (reference numeral 204) that comprises the data content of logical data blocks 5, 6, 7, and 8 of VMDK_A, and a third data object "VMDK_A 3" (reference numeral 206) that comprises the data content of logical data blocks 9, 10, 11, and 5 of VMDK_A. The number specified in the name of each data object indicates the sequence of that object within log 200. Because logical data block 5 appears twice within log 200 (once in VMDK_A 2 and again in VMDK_A 3), the version of data block 5 in the latest/highest-numbered data object VMDK_A 3 is considered the "live," or most current, version of this data block. In contrast, the version of data block 5 in older data object VMDK_A 2 is considered a "dead" version because it has been superseded by the version in newer data object VMDK_A 3.

One consequence of employing an LFS as described above is that, over time, some data objects in cloud object storage platform 106 will accumulate a high percentage of dead data blocks and therefore consume an unnecessary amount of storage space in the platform. To mitigate this, a garbage collector component 118 is implemented in region 110 for garbage collecting (or in other words, "segment cleaning") these data objects. In various embodiments, garbage collector 118 identifies, via metadata database 116, data objects in region 110 of cloud object storage platform 106 that are candidates for cleaning (e.g., data objects that have a relatively large number of dead data blocks and/or exceed a threshold age). Then, for each of the candidate data objects, garbage collector 118 determines the live data blocks remaining in the data object, reads the live data blocks, and writes out the live data blocks to a brand new data object in region 110. Upon completing this process, garbage collector 118 marks the candidate data objects for deletion, thereby reclaiming the storage space consumed by those objects.

As discussed in the Background section, the providers of cloud object storage platforms such as platform 106 of FIG. 1 often guarantee a certain level of durability for the objects maintained on their platforms. For example, with respect to Amazon S3, Amazon guarantees "11 nines" of object durability (or 99.999999999%), which means there is only a 0.000000001% chance that each object stored in S3 will fail in a given year. While this level of durability appears impressive, because it applies to each individual object (rather than collectively to all objects), as the number of objects uploaded to S3 increases, the likelihood of losing at least one of those objects will also increase. As a result, customers that upload extremely large numbers of objects face a significant risk of object loss (e.g., an annual 24% chance of loss for a customer that uploads 100PB of data in the form of 4 MB objects).

One way of increasing the durability of objects maintained in a cloud object storage platform is to employ erasure coding to compute and upload a parity object for every X data objects uploaded to a given region R of the platform. With this approach, referred to as "single region erasure coding" and detailed in commonly-owned U.S. patent application Ser. No. 16/882,246, a lost data object can be reconstructed from the other data/parity objects of that object's erasure coding group in region R.

However, in order to be effective, single region erasure coding generally requires that object failures within each cloud object storage region occur on an independent, or uncorrelated, basis, and this is not the case for several existing cloud object storage platforms. For instance, in Amazon S3, if an object is lost in one region, there is a relatively high likelihood that other objects stored in that same region will also be lost. Thus, maintaining an entire erasure coding group of objects in a single S3 region will not necessarily increase the durability of the objects within that group, because there is a significant chance that multiple objects in the group will be lost together (thereby preventing the reconstruction of any of the lost objects).

Figure 3:
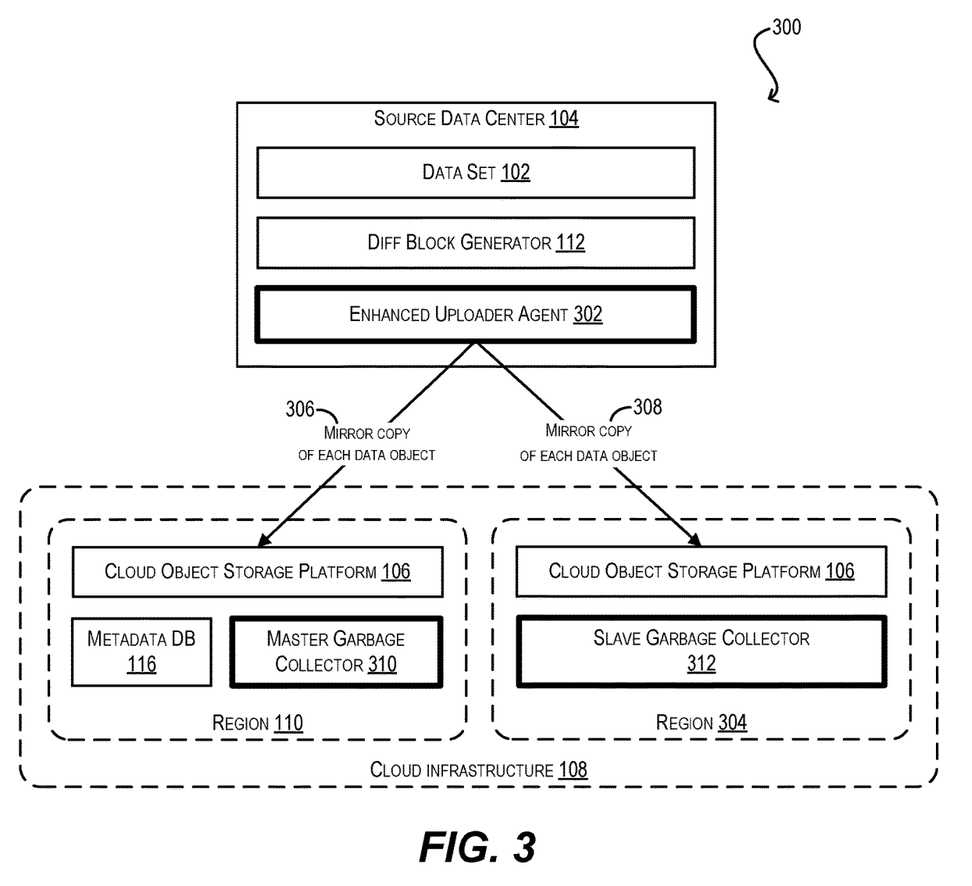
FIG. 3 depicts a modified version of the system environment of FIG. 1 according to certain embodiments.

To address this and other similar problems, FIG. 3 depicts a modified version of system environment 100 of FIG. 1 (i.e., system environment 300) that includes, inter alia, an enhanced uploader agent 302 within source data center 104. As shown in FIG. 3, at the time of uploading data objects for data set 102 to cloud object storage platform 106, enhanced uploader agent 302 can concurrently upload the data objects to at least two separate regions of platform 106 (i.e., region 110 and another region 304) (reference numerals 306 and 308). This results in an identical (i.e., mirror) copy of each data object in each region.

With these mirror copies of the data objects in place, if source data center 104 (or some other storage client, such as a secondary/backup data center) attempts to read a given data object O from region 110 but fails to do so because O has become lost, source data center 104 can retrieve the mirror copy of O from region 304 (or vice versa). Accordingly, this solution approach and architecture advantageously increases the overall object durability of cloud object storage platform 106, beyond any durability guarantees that may be provided at the platform level by the cloud object storage provider.

In addition, because the mirror copies are maintained in completely different regions, this solution approach/architecture does not require object failures to be independent within a given region like the single region erasure coding approach. Instead, it is sufficient for object failures to be independent across regions (which is generally the case for most, if not all, existing cloud object storage platforms).

One complication with the data mirroring approach shown in FIG. 3 is that, at the time of garbage collecting a data object in platform 106, all of the mirror copies of the data object should be cleaned from the regions where they are stored. However, the conventional garage collection process described with respect to FIG. 1 involves a single garbage collector component (i.e., garbage collector 118) running within a single region of cloud infrastructure 108 (i.e., region 110). This means that if garbage collector 118 is used to garbage collect copies of data objects maintained in region 304, it must do so in a remote manner, which will generate a significant amount of cross-region network traffic between regions 110 and 304. This is undesirable because many cloud service providers charge a relatively high bandwidth cost for every gigabyte (GB) of data transferred across the regions of their cloud infrastructures.

To deal with this concern, system environment 300 of FIG. 3 further includes a novel garbage collection architecture comprising a master garbage collector component 310 located in region 110 and a slave garbage collector component 312 located in region 304. Garbage collector component 310 of region 110 is referred to as the "master" garbage collector because it has local access to metadata database 116, which contains the object metadata needed to control/inform the garbage collection process.

As detailed in section (4) below, at the time of initiating garbage collection with respect to the mirrored data objects uploaded by enhanced uploader agent 304, master garbage collector 310 can determine, by referencing metadata database 116, which data objects are candidates for garbage collection and which data blocks within those candidate data objects are still live. Then, instead of directly garbage collecting those candidate data objects in remote region 304, master garbage collector 310 can send metadata regarding the candidate data objects (e.g., their names and live data block ranges) to slave garbage collector 312. In response, slave garbage collector 312 can use the received metadata to identify and garbage collect the candidate data objects within its own region 310. Because the metadata sent by master garbage collector 310 to slave garbage collector 312 is much smaller than the data traffic that would be generated if master garbage collector 310 were to directly manipulate the data objects in region 304, this architecture results in significantly less cross-region bandwidth use than conventional approaches and therefore significantly reduces the cost of carrying out garbage collection.

It should be appreciated that system environment 300 of FIG. 3 is illustrative and not intended to limit embodiments of the present disclosure. For instance, although enhanced uploader agent 302 is shown as uploading mirror copies of data objects to exactly two regions of cloud object storage platform 106, in alternative embodiments enhanced uploader agent 302 may upload mirror copies to three, four, or more regions. By increasing the degree of data mirroring in this manner, the durability level of the mirrored data objects can be increased (at the expense of incurring additional storage and API overhead per object). Further, the various components shown in system environment 300 may include sub-components and/or functions that are not specifically described. One of ordinary skill in the art will recognize other variations, modifications, and alternatives.

3. Enhanced Uploader Agent Workflow

Figure 4:
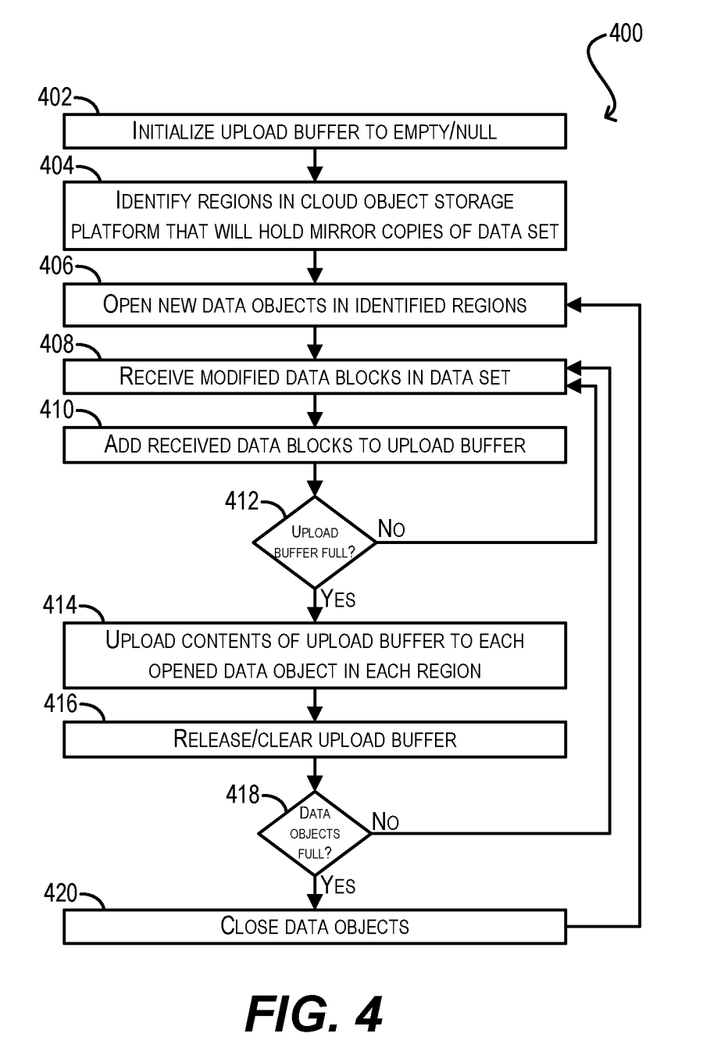
FIG. 4 depicts an upload workflow according to certain embodiments.

FIG. 4 depicts a workflow 400 that provides additional details regarding the processing that may be performed by enhanced uploader agent 302 of FIG. 3 for uploading data set 102 from source data center 104 to multiple regions (e.g., 110 and 304) of cloud object storage platform 106 using data mirroring according to certain embodiments. For efficiency reasons, workflow 400 assumes that enhanced uploader agent 302 uploads data in a streaming fashion using "chunks" that are smaller in size than a data object (e.g., 64 KB chunks). However, in alternative embodiments this chunk-based streaming can be omitted.

Starting with step 402, enhanced uploader agent 302 can initialize an upload buffer to empty/null, where the size of the upload buffer is equal to the size of a single chunk (e.g., 64 KB).

At step 404, enhanced uploader agent 302 can identify the regions of cloud object storage platform 106 that will hold mirror copies of data set 102. This determination can be based on, e.g., the distances between source data center 104 and each region of platform 106 (with shorter distances being desirable). Enhanced uploader agent 302 can then open (or in other words, initialize for writing) new data objects in the identified regions that represent mirror copies of a single data object to be uploaded (step 406). In a particular embodiment, the names of the opened data objects can be identical and can consist of the name of data set 102 and a current LFS log sequence number for the data set.

At step 408, enhanced uploader agent 302 can receive, from diff block generator 112, one or more logical data blocks that have been modified in data set 102. In response, enhanced uploader agent 302 can add the data block(s) to the upload buffer (step 410) and check whether the upload buffer is now full (step 412).

If the answer at step 412 is no, enhanced uploader agent 302 can return to step 408 in order to receive additional modified data blocks from diff block generator 112. However, if the answer at step 412 is yes, enhanced uploader agent 302 can upload (i.e., write) the contents of the upload buffer to each of the data objects opened at step 406 (step 414), thereby creating a mirror copy of the data in each identified region.

At steps 416 and 418, enhanced uploader agent 302 can release/clear the upload buffer and check whether the opened data objects are now full (e.g., have reached their predefined sizes of 4 MB). If the answer is no, enhanced uploader agent 302 can return to step 408.

However, if the answer at step 418 is yes, enhanced uploader agent 302 can close the data objects opened at step 406 (step 420) and return to step 406 in order to open and upload a new mirrored set of objects.

4. Garbage Collection Workflows

Figure 5:
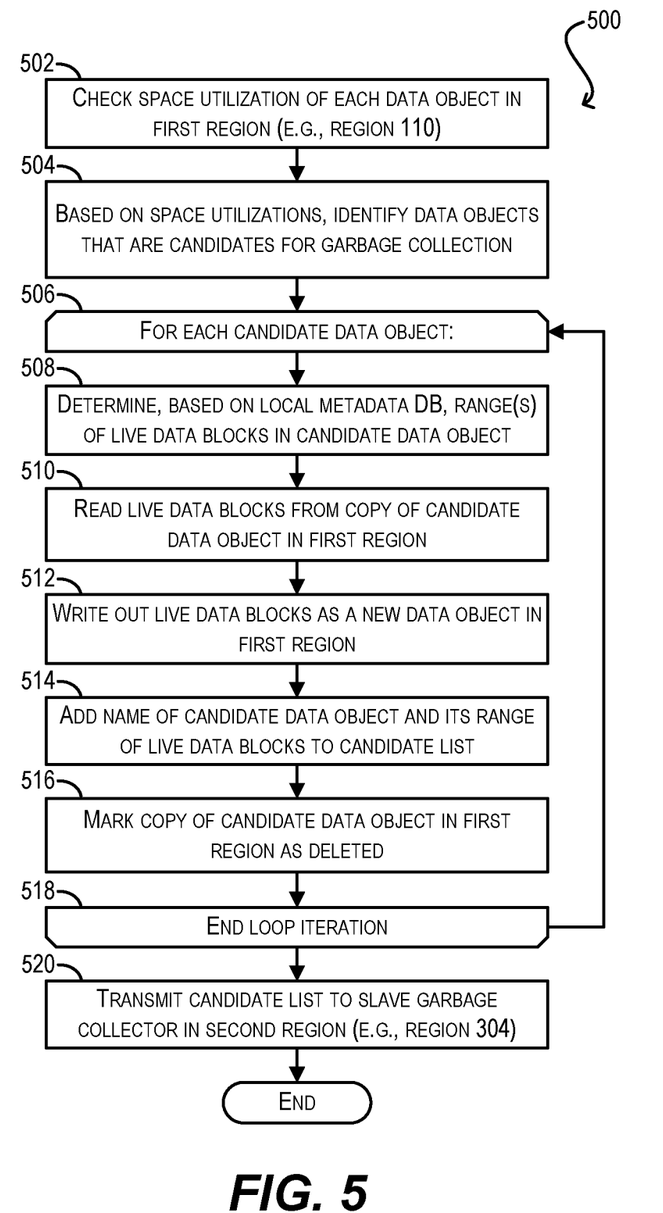
FIG. 5 depicts a first garbage collection workflow according to certain embodiments.
Figure 6:
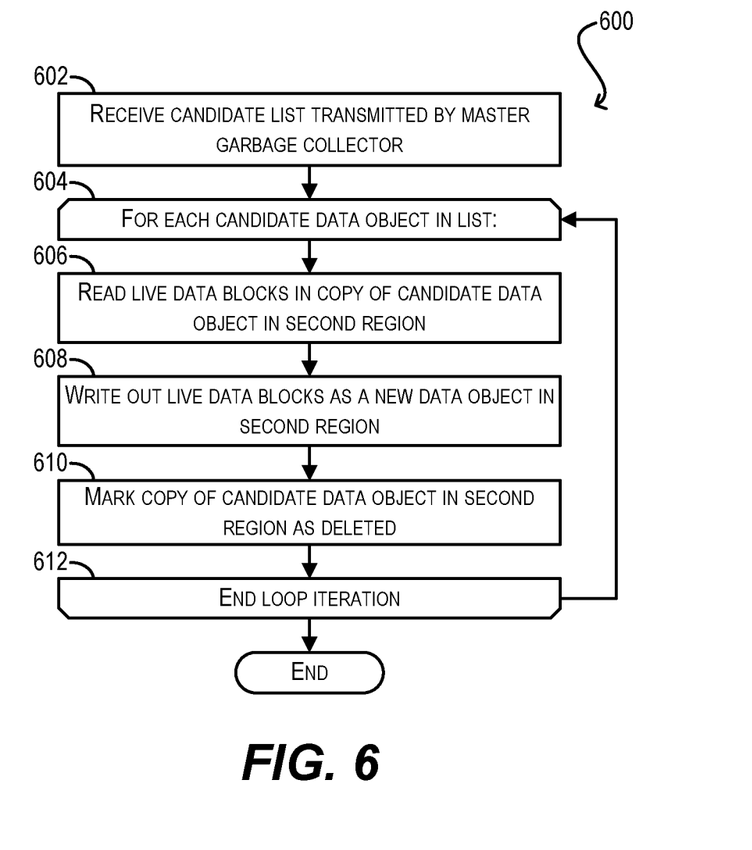
FIG. 6 depicts a second garbage collection workflow according to certain embodiments.

FIGS. 5 and 6 depicts workflows 500 and 600 that can be performed by master and slave garbage collectors 310 and 312 of FIG. 3 respectively for garbage collecting mirrored data objects uploaded by enhanced uploader agent 302 to regions 110 and 304 according to certain embodiments.

Starting with workflow 500, at steps 502 and 504, master garbage collector 310 can check the space utilization of each data object maintained in region 110 of cloud object storage platform 106 and, based on these space utilizations, identify data objects that are candidates for garbage collection. In one set of embodiments, the space utilization check at step 502 can comprise accessing a segment usage table (SUT) in metadata database 116 to determine the number of live data blocks in each data object and the candidate identification at step 504 can comprise identifying those data objects whose percentage of live data blocks is below a threshold (e.g., 30%).

At step 506, master garbage collector 310 can enter a loop for each candidate data object identified at step 504. Within this loop, master garbage collector 310 can determine, via metadata database 116, the range(s) of live data blocks in the candidate data object (step 508), read those live data blocks from the copy of the data object in region 110 (step 510), and write out the live data blocks as a new data object in region 110 (step 512). Master garbage collector 310 can further add the name of the candidate data object and its range(s) of live data blocks to a candidate list to be transmitted to slave garbage collector 312 (step 514).

At step 516, master garbage collector 310 can mark the copy of the candidate data object in region 110 as deleted. Master garbage collector 310 can then reach the end of the current loop iteration (step 518) and return to step 506 in order to process the next candidate data object. Finally, once all of the candidate data objects have been processed, master garbage collector 310 can transmit the candidate list to slave garbage collector 312 (step 522) and terminate the workflow.

Turning now to workflow 600, at steps 602 and 604, slave garbage collector 312 can receive the candidate list sent by master garbage collector 310 at step 522 and can enter a loop for each candidate data object identified in the list.

Within this loop, slave garbage collector 312 can read all of the live data blocks in the copy of the candidate data object in region 304, per the live data block range(s) included in the received list (step 606). Slave garbage collector 312 can then write out the live data blocks to a new data object in region 304 (step 608).

Finally, slave garbage collector 312 can mark the copy of the candidate data object in region 304 as deleted (step 610) and reach the end of the current loop iteration (step 612). The foregoing process can repeat until all candidate data objects in the candidate list have been processed.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    identifying, by a first garbage collector component running at a first region of a cloud object storage platform, a first data object stored at the first region as a candidate for garbage collection, wherein the first data object is a mirror copy of a second data object stored at a second region of the cloud object storage platform;
    determining, by the first garbage collector component, a range of live data blocks in the first data object, the determining being based on a metadata database residing at the first region that holds metadata for the first and second data objects;
    reading, by the first garbage collector component, content of the range of live data blocks from the first data object;
    writing, by the first garbage collector component, the content of the range of live data blocks as a third data object in the first region; and
    transmitting, by the first garbage collector component to a second garbage collector component running at the second region, garbage collection metadata including an identifier of the first data object and the range of live data blocks.

2. The method of claim 1 wherein the garbage collection metadata excludes the content of the range of live data blocks.

3. The method of claim 1 wherein the first and second data objects share a common name, and wherein the identifier of the first data object included in the garbage collection metadata is the common name.

4. The method of claim 1 wherein the identifying comprises:
    determining that a percentage of live data blocks in the first data object is below a predefined threshold.

5. The method of claim 1 wherein upon receiving the garbage collection metadata, the second garbage collector component:
    reads content of the range of live data blocks from the second data object;
    writes the content of the range of live data blocks read from the second data object as a fourth data object in the second region; and
    marks the second data object as deleted at the second region.

6. The method of claim 1 further comprising:
    marking the first data object as deleted at the first region.

7. The method of claim 1 wherein the first and second regions correspond to first and second sets of servers of the cloud object storage platform respectively that are located in different geographic areas.

8. A non-transitory computer readable storage medium having stored thereon program code executable by a first server running at a first region of a cloud object storage platform, the program code embodying a method comprising:
    identifying a first data object stored at the first region as a candidate for garbage collection, wherein the first data object is a mirror copy of a second data object stored at a second region of the cloud object storage platform;
    determining a range of live data blocks in the first data object, the determining being based on a metadata database residing at the first region that holds metadata for the first and second data objects;
    reading content of the range of live data blocks from the first data object;
    writing the content of the range of live data blocks as a third data object in the first region; and
    transmitting, to a second server running at the second region, garbage collection metadata including an identifier of the first data object and the range of live data blocks.

9. The non-transitory computer readable storage medium of claim 8 wherein the garbage collection metadata excludes the content of the range of live data blocks.

10. The non-transitory computer readable storage medium of claim 8 wherein the first and second data objects share a common name, and wherein the identifier of the first data object included in the garbage collection metadata is the common name.

11. The non-transitory computer readable storage medium of claim 8 wherein the identifying comprises:
    determining that a percentage of live data blocks in the first data object is below a predefined threshold.

12. The non-transitory computer readable storage medium of claim 8 wherein upon receiving the garbage collection metadata, the second server:
    reads content of the range of live data blocks from the second data object;
    writes the content of the range of live data blocks read from the second data object as a fourth data object in the second region; and
    marks the second data object as deleted at the second region.

13. The non-transitory computer readable storage medium of claim 8 wherein the method further comprises:
    marking the first data object as deleted at the first region.

14. The non-transitory computer readable storage medium of claim 8 wherein the first and second regions correspond to first and second sets of servers of the cloud object storage platform respectively that are located in different geographic areas.

15. A computer system running within a first region of a cloud object storage platform, the computer system comprising:
    a processor; and
    a non-transitory computer readable medium having stored thereon program code that, when executed, causes the processor to:
        identify a first data object stored at the first region as a candidate for garbage collection, wherein the first data object is a mirror copy of a second data object stored at a second region of the cloud object storage platform;
        determine a range of live data blocks in the first data object, the determining being based on a metadata database residing at the first region that holds metadata for the first and second data objects;
read content of the range of live data blocks from the first data object;
write the content of the range of live data blocks as a third data object in the first region; and
transmit, to another computer system running at the second region, garbage collection metadata including an identifier of the first data object and the range of live data blocks.

16. The computer system of claim 15 wherein the garbage collection metadata excludes the content of the range of live data blocks.

17. The computer system of claim 15 wherein the first and second data objects share a common name, and wherein the identifier of the first data object included in the garbage collection metadata is the common name.

18. The computer system of claim 15 wherein the program code that causes the processor to identify the first data object as a candidate for garage collection comprises program code that causes the processor to:

determine that a percentage of live data blocks in the first data object is below a predefined threshold.

19. The computer system of claim 15 wherein upon receiving the garbage collection metadata, said another computer system:

reads content of the range of live data blocks from the second data object;
writes the content of the range of live data blocks read from the second data object as a fourth data object in the second region; and
marks the second data object as deleted at the second region.

20. The computer system of claim 15 wherein the program code further causes the processor to:

mark the first data object as deleted at the first region.

21. The computer system of claim 15 wherein the first and second regions correspond to first and second sets of computer systems of the cloud object storage platform respectively that are located in different geographic areas.

* * * * *